Patented July 25, 1939

2,167,238

UNITED STATES PATENT OFFICE 2,167,238

PROCESS FOR THE MANUFACTURE OF VERY PURE ALUMINUM COMPOUNDS

Nathanas Griunsteinas, also known as Nathan Grunstein, Haifa, Palestine

No Drawing. Application March 11, 1937, Serial No. 130,303. In Great Britain March 16, 1936

14 Claims. (Cl. 23—123)

This invention relates to a process for the manufacture of very pure basic aluminum sulfate from crude solutions of aluminum sulfate as obtained, for instance, by treating with sulfuric acid, aluminum containing raw materials, such as bauxite, alumina, and other minerals containing compounds of aluminum, particularly silica-alumina compounds, waste aluminum and the like.

It has already been proposed to manufacture basic aluminum sulfate by introducing metallic iron into crude aluminum sulfate solutions in which any iron salts already present had previously been reduced, whereupon the solutions are heated for some time and then, without further treatment, poured into water. With this process basic aluminum sulfate is expected to separate and may be reclaimed by filtering or centrifuging. No details have been given as to the manner of performing such process and to the yield of the basic sulfate.

It has been found that the information made known so far has not been sufficient for establishing a technically suitable process, especially for the reason that the basic aluminum sulfate cannot be obtained free from iron and in a satisfactory yield. This seems to have been due more particularly to two reasons:

1. A satisfactory yield cannot be obtained if the whole iron, as proposed up to now, is at once introduced into the crude solution of aluminum sulfate, for the metallic iron becomes inactivated during the reaction.

2. Before pouring the iron containing solution of aluminum sulfate into water, no special measures are taken in order to remove from the solution any metallic iron finely divided and suspended therein. Such iron passes, therefore, into the subsequent precipitate of basic aluminum sulfate from which it cannot be removed. In the purification of aluminum sulfate it is, however, the most difficult technical problem to remove the last perceptible traces of iron.

For the above reasons, the process referred to does not seem to have found so far any technical application.

This invention is equally based upon the treatment with metallic iron of aluminum sulfate solutions. It shows that by observing special working conditions which heretofore have either not been known or could not be supposed to be advisable, the process may be directed so that pure basic aluminum sulfate practically free from iron may be obtained in a very large yield. At the same time, the process can be utilized for manufacturing pure by-products from the auxiliary reagents used (sulfuric acid, iron).

The process according to this invention comprises the following steps:

(a) Using crude aluminum sulfate solutions of a concentration not below a certain minimum to be more particularly defined hereinbelow;

(b) Dissolving the highest possible quantity of iron in such solutions while heating the latter up to suitable temperatures, finally up to the boiling point of the solution.

(c) Purifying the reaction liquor from any metallic iron present, especially finely divided and suspended iron, by cautious filtering and/or optionally by centrifuging or other suitable methods.

(d) Allowing the purified solution to cool whereby a compound containing aluminum, iron and sulfuric acid ions, precipitates in the form of beautiful crystals, possibly also basic aluminum sulfate, and separating such precipitate from the mother liquor.

(e) Taking up in water the precipitate preferably in the heat, whereby a pure basic aluminum sulfate free from iron is precipitated.

Instead of the above steps (d) and (e), the purified concentrated reaction liquor can immediately be diluted, preferably while hot, whereby pure basic aluminum sulfate is precipitated. This operating method seems to be the best as regards the technical realization of the process.

According to the invention, the concentration of the crude aluminum sulfate solution is to be chosen so that the compound indicated above under step (d), possibly together with basic aluminum sulfate, can separate when the purified concentrated reaction liquor is allowed to cool. It may be supposed that the said compound is a complex salt. This assumption is supported especially by the formation of well-shaped crystals which, when treated with water, decompose into basic aluminum salt containing but little $SO_4$-ion, namely about 20 per cent of that originally contained in the aluminum sulfate, and ferrous sulfate which is thereby dissolved.

It has been found that, for this purpose, the concentration of the crude aluminum sulfate solution has to be above about 45 per cent by weight of $Al_2(SO_4)_3.18H_2O$ corresponding to about 6.8 per cent by weight of $Al_2O_3$ (that is to say more than 450 grams $Al_2(SO_4)_3.18H_2O$ in 1000 grams of the solution).

If the process be carried out in the manner described hereinbefore by treating in the heat, the crude aluminum sulfate solution with metallic iron until no more iron dissolves, and then purifying the reaction liquor, and if a concentration of the crude aluminum sulfate solution below the limit indicated is chosen, large amounts of a precipitate consisting mainly of basic aluminum sulfate comminuted with iron separate both before and during the purification of the hot reaction liquor. This, for instance, is still true with a concentration of somewhat below 45 per cent of $Al_2(SO_4)_3.18H_2O$. If, however, the process is started with a concentration above that limit, there will be practically no formation of a precipitate out of the hot concentrated reaction liquor. It seems that the indicated minimum concentration forms a limit above which the said complex salt is stable in the solution itself, and below that limit, the complex salt which probably is formed intermediarily is at once decomposed in basic aluminum sulfate which precipitates, and ferrous sulfate which remains in solution.

In practice, it is advisable to use a concentration not below 47.5 per cent. of $Al_2(SO_4)_3.18H_2O$ corresponding to about 7.3 per cent. of $Al_2O_3$; even substantially higher concentrations may be used, for instance 55 per cent. of $$Al_2(SO_4)_3.18H_2O$$

corresponding to about 8.4 per cent of $Al_2O_3$. It is also possible to operate at still greater concentrations, but in this case some difficulties in filtering the viscous liquid will generally have to be overcome.

For an economical performance of the process according to this invention, it is necessary to dissolve in the crude aluminum sulfate solution, the maximum possible amount of iron. When insufficient quantities of iron are dissolved, the basic aluminum sulfate or complex salt will not completely separate when the purified concentrated reaction liquor is diluted, or allowed to cool respectively, but a more or less considerable part of aluminum salt remains dissolved in the solution of ferrous sulfate.

It has been found that the maximum possible of iron can be dissolved in the solution of aluminum sulfate only by introducing into the reaction liquor, fresh iron towards the end of the reaction, for the iron present becomes inactivated during the reaction, apparently because its surface becomes contaminated. For this purpose, the bulk of the iron to be dissolved may be brought into the crude aluminum sulfate solution at the beginning of the reaction, that is to say, iron may be present therein in excess, and small amounts of fresh iron may be added later on when the iron already present ceases to dissolve. Alternatively, small amounts of fresh iron may be added during the entire reaction. Technically, the process may even be carried out in countercurrent in such a manner that the fresh or cleaned iron to be dissolved is always brought into those parts of the reaction liquor which have already the highest iron contents. The inactive iron can be re-activated by cleaning its surface mechanically or with the aid of diluted acids, and may then be used again. Such iron has a particularly high activity and is very rapidly dissolved.

The iron is preferably used in comminuted form, for instance as waste or scrap iron of any kind, filings, powder or the like. It is advisable to previously clean the iron mechanically, for it has been found that any adhering impurities, especially grease, are liable to cause a premature precipitation of impure basic aluminum sulfate even from the concentrated reaction liquor. Instead of, or after, the mechanical purification, the iron may be etched with an acid, such as sulfuric or hydrochloric acid, preferably under heating, whereby its solubility is increased.

The process of dissolving the iron in the reaction liquid can quantitatively be observed by measuring the amount of hydrogen evolved thereby. When the hydrogen practically ceases to be evolved, this indicates that the maximum possible quantity of iron has been brought into solution.

At the beginning, the iron dissolves very rapidly, but towards the end of the process, this reaction slows down. It is, therefore, advisable, to carry out the reaction at the beginning at a temperature of about 70–90° C. and then to raise the temperature up to the boiling point of the solution. It is also possible to operate from the beginning at a higher temperature near the boiling point, if the reaction is not too rapid.

It is important to carry out all steps subsequent to dissolving the iron (steps (c) and following) while excluding air or oxygen in order to prevent any oxidation of the ferrous sulfate formed, for it has been found that the dissolved iron will not be precipitated by way of absorption on the subsequent precipitate of basic aluminum sulfate and/or complex salt only if present in its bivalent form. For the same reason, it is advisable to use hot water, preferably boiled until being free from gases, for diluting the concentrated reaction liquor, or taking up the complex salt.

The process may also be improved by adding to the solution during or immediately after its purification a reducing agent, for instance sulfites, hyposulfites etc.

A most suitable reducing agent is aluminum sulfite. ($Al_2(SO_3)_3$), which has the advantage that no other metal is introduced into the solution.

Purification of the concentrated reaction liquor after dissolving the iron can be done by filtering or centrifuging in the heat.

The filtration must be very carefully executed, so as to avoid the passage through the filter of very finely divided metallic iron. If necessary, those iron particles which have passed through the filter may be afterwards eliminated by centrifuging.

It is one of the remarkable features of the process described hereinbefore that most of the impurities of crude iron are not dissolved and are, therefore, removed by the purification of the reaction liquor (step c). Thus, very pure ferrous sulfate remains in the solution after precipitating the basic aluminum sulfate. Such pure ferrous sulfate can be reclaimed by concentrating the solution. Hereby, any basic aluminum sulfate still present in solution is first precipitated and may be re-incorporated with the reaction liquor of a fresh reaction, while the pure ferrous sulfate obtained can be worked up in a manner known per se to yield pure ferric oxide or pure metallic iron and sulfurous acid. Thus, the process according to this invention allows of the obtention of those pure substances as by-products even where crude metallic iron and crude sulfuric acid are used as auxiliary raw materials.

The yield of pure basic aluminum sulfate obtained as a final product is very large and may amount to 95 per cent. or more of the theoretical value.

When the reaction is carried out under suitable conditions, the whole process can be executed very quickly.

The new process is of special importance, for it also allows of the use of such raw materials of high silica contents, the working up of which has been practically impossible up to now.

*Example*

A crude concentrated aqueous solution of aluminum sulfate is obtained, for instance, by dissolving bauxite in sulfuric acid.

The natural bauxite is preferably subjected to a heating before being treated with sulfuric acid, so as to destroy the bulk of the organic impurities. An aqueous solution is then prepared having a concentration of about 53 per cent. by weight of $Al_2(SO_4)_3.18H_2O$ corresponding to about 8.1 per cent. by weight of $Al_2O_3$ and containing varying amounts, for instance 10–25 per cent. of ferrous sulfate, and is treated with an excess of cleaned comminuted crude metallic iron while heating to about 70–90° C. The hydrogen evolved during the reaction is collected and measured. When the reaction slows down, the liquor is heated up to its boiling point. As soon as the development of hydrogen ceases, fresh iron is introduced into the solution, and this is continued until hydrogen ceases practically to be evolved.

From this moment and during the subsequent steps, any air or oxygen is excluded or a reducing medium is created by adding a reducing agent.

The hot reaction liquor is separated from the undissolved iron and either filtered, or centrifuged, or filtered with subsequent centrifuging of the hot filtrate. The hot purified liquid is mixed with hot or boiling water freed from gas.

From the diluted liquor, an absolutely white aluminum salt containing but little $SO_4$, namely about 20 per cent. of the sulfuric acid contained in the aluminum sulfate separates out. The precipitate is separated from the ferrous sulfate solution and carefuly washed. The product is practicaly free from iron.

When the mother liquor is allowed to cool and stand for a long time, further amounts of basic aluminum sulfate are precipitated which may be re-incorporated with the starting solution of a fresh reaction.

The undissolved iron is again used for a fresh reaction, if required after purification of its surface.

I claim:

1. A process for manufacturing pure basic aluminum sulfate, comprising dissolving metallic iron in a crude aluminum sulfate solution of a concentration of at least about 45 per cent by weight of $Al_2(SO_4)_3.18H_2O$ under heating, purifying the solution from metallic iron by separating the iron from the solution while the same is hot, and recovering pure basic aluminum sulfate by adding water to the reaction product.

2. A process, as claimed in claim 1, in which the possible maximum of metallic iron is dissolved in said crude solution of aluminum sulfate.

3. A process as claimed in claim 1, in which the possible maximum of metallic iron is dissolved in said crude solution of aluminum sulfate before the heating of said solution, fresh portions of metallic iron being added from time to time during the heating until no more iron dissolves in the solution even under heating.

4. A process, as claimed in claim 1, in which an excess of iron is present in said crude solution of aluminum sulfate from the beginning of the reaction, and further amounts of fresh iron are added towards the end of the reaction.

5. A process, as claimed in claim 1, in which amounts of fresh iron are introduced into said crude solution of aluminum sulfate in the course of the reaction, and in countercurrent to the solution in such a manner that the fresh metallic iron is introduced in those parts of the reaction solution which already have the highest iron contents.

6. A process, as claimed in claim 1, in which undissolved metallic iron remaining from a preceding reaction is used in a subsequent reaction.

7. A process, as claimed in claim 1, in which the temperature of the reaction solution is maintained at about 70°–90° C. at the beginning of the reaction and is raised later on up to the boiling point of the reaction mixture.

8. A process for manufacturing pure basic aluminum sulfate, comprising dissolving metallic iron in a crude aluminum sulfate solution of a concentration of at least about 45 per cent. by weight of $Al_2(SO_4)_3.18H_2O$ under heating, purifying the hot reaction liquor by filtering while maintaining reducing conditions, allowing the reaction liquid to cool, separating therefrom a precipitate consisting of an aluminum-ferrous-sulfate, taking the precipitate up in water, and separating the basic aluminum sulfate thereby precipitated from the liquid containing ferrous sulfate.

9. A process for manufacturing pure basic aluminum sulfate, comprising dissolving metallic iron in a crude aluminum sulfate solution of a concentration of at least about 45 per cent. by weight of $Al_2(SO_4)_3.18H_2O$ under heating, purifying the hot reaction liquor by filtering while maintaining reducing conditions, diluting the reaction liquor with water, and separating the basic aluminum sulfate thereby precipitated from the liquid containing ferrous sulfate.

10. A process for manufacturing pure basic aluminum sulfate, comprising dissolving metallic iron in a crude aluminum sulfate solution of a concentration of at least about 45 per cent. by weight of $Al_2(SO_4)_3.18H_2O$ under heating, purifying the hot reaction liquor by filtering while maintaining reducing conditions, diluting the reaction liquid with water while adding a reducing agent, and separating the basic aluminum sulfate thereby precipitated from the liquid containing ferrous sulfate.

11. A process for manufacturing pure basic aluminum sulfate, comprising dissolving metallic iron in a crude aluminum sulfate solution of a concentration of at least about 45 per cent. by weight of $Al_2(SO_4)_3.18H_2O$ under heating, purifying the hot reaction liquor by filtering while maintaining reducing conditions, diluting the reaction liquid with water while adding aluminum sulfite, and separating the basic aluminum sulfate thereby precipitated from the liquid containing ferrous sulfate.

12. A process as claimed in claim 8, wherein the liquid containing ferrous sulfate as obtained after separating therefrom the basic aluminum sulfate precipitate, is concentrated for reclaiming pure ferrous sulfate.

13. A process as claimed in claim 9, wherein the liquid containing ferrous sulfate as obtained after separating therefrom the basic aluminum sulfate precipitate, is concentrated for reclaiming pure ferrous sulfate.

14. A process as claimed in claim 9, wherein any impure aluminum compounds separating in the course of the process are re-incorporated with the starting solution of crude aluminum sulfate for carrying out a fresh reaction.

NATHANAS GRIUNSTEINAS,
*Also known as Nathan Grunstein.*